United States Patent
Zhao et al.

(10) Patent No.: US 10,585,326 B2
(45) Date of Patent: Mar. 10, 2020

(54) ELECTRONIC PAPER, MANUFACTURING METHOD THEREOF, AND HANDWRITING ELECTRONIC PAPER DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Detao Zhao, Beijing (CN); Pengju Zhang, Beijing (CN); Bin Li, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 16/029,241

(22) Filed: Jul. 6, 2018

(65) Prior Publication Data
US 2019/0204706 A1 Jul. 4, 2019

(30) Foreign Application Priority Data
Jan. 3, 2018 (CN) .......................... 2018 1 0004731

(51) Int. Cl.
*G02F 1/1673* (2019.01)
*G06F 3/0354* (2013.01)
(Continued)

(52) U.S. Cl.
CPC .......... *G02F 1/1673* (2019.01); *G06F 3/0383* (2013.01); *G06F 3/03545* (2013.01);
(Continued)

(58) Field of Classification Search
CPC .. G02F 1/167; G02F 2001/094; G02F 1/0036; G02F 1/1673; G06F 3/046; G06F 3/03545; G09G 3/344–03446
See application file for complete search history.

(56) References Cited

U.S. PATENT DOCUMENTS 4,675,467 A * 6/1987 Van Dine .......... H01L 21/76888
136/249
4,675,476 A * 6/1987 Kobayashi .............. G06F 3/033
345/173

(Continued)

FOREIGN PATENT DOCUMENTS

CN 101211520 A 7/2008
CN 102197439 A 9/2011

*Primary Examiner* — Sanjiv D. Patel
(74) *Attorney, Agent, or Firm* — Brooks Kushman P.C.

(57) ABSTRACT

The present disclosure relates to the field of display technology, and provides an electronic paper, a manufacturing method thereof, and a handwriting electronic paper device. The electronic paper includes: a first electrode; a second transparent electrode arranged opposite to the first electrode and at a display side of the electronic paper; and an electronic ink layer arranged between the first electrode and the second transparent electrode. Microcapsules are distributed in the electronic ink layer, and each microcapsule is provided therein with charged magnetic particles which are capable of being used to display at least one color.

17 Claims, 2 Drawing Sheets

(51) Int. Cl.
  *G06F 3/041* (2006.01)
  *G06F 3/046* (2006.01)
  *G06F 3/038* (2013.01)
  *G02F 1/1675* (2019.01)
  *G02F 1/1676* (2019.01)
  *G02F 1/1681* (2019.01)
(52) U.S. Cl.
  CPC ............ *G06F 3/046* (2013.01); *G06F 3/0412* (2013.01); *G02F 1/1676* (2019.01); *G02F 1/1681* (2019.01); *G02F 2001/1678* (2013.01)

(56) References Cited

U.S. PATENT DOCUMENTS

| | | | | |
|---|---|---|---|---|
| 2004/0136046 | A1* | 7/2004 | Ho | G02F 1/09 |
| | | | | 359/296 |
| 2007/0268567 | A1* | 11/2007 | Chung | G02F 1/167 |
| | | | | 359/296 |
| 2010/0101832 | A1 | 4/2010 | Verhaverbeke et al. | |
| 2014/0362158 | A1* | 12/2014 | Yamashita | G02F 1/167 |
| | | | | 347/221 |
| 2018/0088692 | A1* | 3/2018 | Du | G06F 3/03545 |

* cited by examiner

ELECTRONIC PAPER, MANUFACTURING METHOD THEREOF, AND HANDWRITING ELECTRONIC PAPER DEVICE

CROSS-REFERENCE TO RELATED APPLICATION

This application claims priority to Chinese Patent Application No. 201810004731.1 filed on Jan. 3, 2018, which is incorporated herein by reference in its entirety.

TECHNICAL FIELD

The present disclosure relates to the field of display technology, in particular to an electronic paper, a manufacturing method thereof, and a handwriting electronic paper device.

BACKGROUND

Electronic paper, as a display device driven by an electric field, becomes more and more popular due to such advantages as being easy to read, light, thin, flexible and power-saving. It is predicted that the market of the electronic paper will grow persistently and stably, more than 3.4 billion US dollars in the year of 2020.

The electronic paper is a thin film manufactured by coating tens of thousands of capsule-like particles (called as microcapsules) onto a plastic substrate. As a basic unit of the electronic paper, each microcapsule contains therein two kinds of nanoparticles in different colors, i.e., white titanium oxide particles and black carbon powder. Each white particle is positively charged, and each black particle is negatively charged. In the case that a negative electric field is applied onto an electrode plate at an upper surface of the electronic paper, the positively-charged white particles may be absorbed onto, and aggregated at, the electrode plate under the effect of the electric field, so as to enable the electrode plate to be in white. At the same time, the negatively-charged black particles are repelled to, and hidden at, a bottom electrode under the effect of the electric field. In the case that a positive electric field is applied onto the electrode plate at the upper surface of the electronic paper, the black particles move in an opposite direction, and so do the white particles. This is just a basic principle of the electronic paper.

Due to the bistability of the white and black particles, in the case that a static image is displayed, no power consumption may occur for the electronic paper. In other words, even in the case that no power is supplied, it is still able for the electronic paper to display a last image. However, in the case that content displayed on the electronic paper is to be rewritten after the electronic paper is powered off, it is necessary to power on the electronic paper again, so this operation is relatively complex. Undoubtedly, the market competitiveness of the electronic paper will be significantly increased by providing a writing function in a power off state.

SUMMARY

In one aspect, the present disclosure provides in some embodiments an electronic paper, including: a first electrode; a second transparent electrode arranged opposite to the first electrode and at a display side of the electronic paper; and an electronic ink layer arranged between the first electrode and the second transparent electrode. Microcapsules are distributed in the electronic ink layer, and each microcapsule is provided therein with charged magnetic particles which are capable of being used to display at least one color.

In a possible embodiment of the present disclosure, each charged magnetic particle includes: a charged sphere; magnetic nanoparticles arranged at a surface of the charged sphere; and a colored layer covering the magnetic nanoparticles and the charged sphere, a color of the colored layer being substantially identical to a color to be displayed by the charged magnetic particle.

In a possible embodiment of the present disclosure, the magnetic nanoparticles include nickel (Ni) and ferroferric oxide ($Fe_3O_4$) nanoparticles.

In a possible embodiment of the present disclosure, the charged magnetic particles include at least one of black charged magnetic particles, red charged magnetic particles, green charged magnetic particles and blue charged magnetic particles.

In a possible embodiment of the present disclosure, each microcapsule is of a spherical shape.

In a possible embodiment of the present disclosure, each microcapsule is of an ellipsoidal shape.

In a possible embodiment of the present disclosure, in the case that each microcapsule is provided therein with the charged magnetic particles in more than two colors, a magnetism property of the charged magnetic particle is adjusted by adjusting the number of the magnetic nanoparticles on the charged sphere.

In another aspect, the present disclosure provides in some embodiments a method for manufacturing an electronic paper, including steps of: forming a first electrode; forming a second transparent electrode opposite to the first electrode and at a display side of the electronic paper; and forming an electronic ink layer between the first electrode and the second transparent electrode, microcapsules being distributed in the electronic ink layer. The method further includes providing in each microcapsule charged magnetic particles which are capable of being used to display at least one color.

In a possible embodiment of the present disclosure, the method further includes preparing the charged magnetic particles. The step of preparing the charged magnetic particles includes: providing a charged sphere; depositing magnetic nanoparticles onto a surface of the charged sphere through a chemical plating process; and depositing a colored layer onto the surface of the charged sphere with the magnetic nanoparticles, a color of the colored layer being substantially identical to a color to be displayed by the charged magnetic particle.

In a possible embodiment of the present disclosure, the step of depositing the magnetic nanoparticles onto the surface of the charged sphere through a chemical plating process includes: adding a nickel chloride ($NiCl_2$) solution, absolute ethyl alcohol and distilled water into a solution containing the charged spheres so as to acquire a mixture, stirring the mixture, heating and stirring the mixture in a constant-temperature magnetic stirrer, and adding a sodium hydroxide (NaOH) solution into the mixture during a heating and stirring procedure so as to increase a pH value of the mixture to 14; and adding hydrazine hydrate into the mixture with the pH value of 14 in a dropwise manner, heating the mixture and maintaining the mixture at a temperature of 50° C. for 0.4 to 0.6 h, washing the mixture, and drying the resultant mixture in a vacuum drying oven at a temperature of 50° C. for 1.8 to 2.2 h, so as to acquire the charged sphere onto the surface of which magnetic nickel nanoparticles are deposited.

In a possible embodiment of the present disclosure, the step of depositing the colored layer onto the surface of the charged sphere deposited with the magnetic nanoparticles includes subjecting the charged sphere onto the surface of which the magnetic nickel nanoparticles are deposited into ultrasonic dispersion in an ethanol solution, adding the resultant charged sphere into a dopamine solution at a concentration of 0.5 to 4 g/L and a pH value of 6.0 to 10.0, and stirring a resultant mixture at a rate of 30 to 100 revolutions per minute (rpm) for 2 to 48 h, so as to acquire the black charged magnetic particle onto a surface of which polydopamine particles are deposited.

In yet another aspect, the present disclosure provides in some embodiments a handwriting electronic paper device, including an electronic paper. The electronic paper includes: a first electrode; a second transparent electrode arranged opposite to the first electrode and at a display side of the electronic paper; and an electronic ink layer arranged between the first electrode and the second transparent electrode. Microcapsules are distributed in the electronic ink layer, and each microcapsule is provided therein with charged magnetic particles which are capable of being used to display at least one color.

In a possible embodiment of the present disclosure, each charged magnetic particle includes: a charged sphere; magnetic nanoparticles arranged at a surface of the charged sphere; and a colored layer covering the magnetic nanoparticles and the charged sphere, a color of the colored layer being substantially identical to a color to be displayed by the charged magnetic particle.

In a possible embodiment of the present disclosure, the magnetic nanoparticles include Ni and $Fe_3O_4$ nanoparticles.

In a possible embodiment of the present disclosure, the charged magnetic particles include at least one of black charged magnetic particles, red charged magnetic particles, green charged magnetic particles and blue charged magnetic particles.

In a possible embodiment of the present disclosure, each microcapsule is of a spherical shape.

In a possible embodiment of the present disclosure, each microcapsule is of an ellipsoidal shape.

In a possible embodiment of the present disclosure, in the case that each microcapsule is provided therein with the charged magnetic particles in more than two colors, a magnetism property of the charged magnetic particle is adjusted by adjusting the number of the magnetic nanoparticles on the charged sphere.

In a possible embodiment of the present disclosure, the writing electronic paper device further includes an electronic stylus. The electronic stylus includes: a body; an electrically conductive coil wound onto the body; and a controller configured to control an energized state of the electrically conductive coil and a current flowing through the electrically conductive coil.

In a possible embodiment of the present disclosure, a thickness of a stroke on the electronic paper is adjusted by adjusting an intensity of a magnetic field applied onto the electronic paper.

Figure 1:
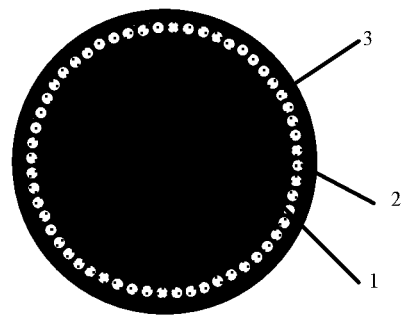
FIG. 1 is a schematic view showing a charged magnetic particle according to one embodiment of the present disclosure.

REFERENCE SIGN LIST 1 charged magnetic particle
2 magnetic nanoparticle
3 color layer
4 tip
5 body
6 variable resistor
7 first electrode
8 second transparent electrode
9 white charged particle
10 microcapsule

DETAILED DESCRIPTION

In order to make the objects, the technical solutions and the advantages of the present disclosure more apparent, the present disclosure will be described hereinafter in a clear and complete manner in conjunction with the drawings and embodiments.

Currently, electronic papers have been widely used. For example, in a supermarket, usually the electronic paper is used as a label to display information and price about an article. However, the price of the article changes frequently. After the electronic paper is powered off, it is necessary to power on the label again so as to change the information and the price about the article. Hence, the operation is very inconvenient.

An object of the present disclosure is to provide an electronic paper, a manufacturing method thereof, and a handwriting electronic paper device, so as to perform a writing operation on the electronic paper in a power-off state.

The present disclosure provides in some embodiments an electronic paper, which includes: a first electrode; a second transparent electrode arranged opposite to the first electrode and at a display side of the electronic paper; and an electronic ink layer arranged between the first electrode and the second transparent electrode. Microcapsules are distributed in the electronic ink layer, and each microcapsule is provided therein with charged magnetic particles which are capable of being used to display at least one color.

According to the embodiments of the present disclosure, the microcapsules are distributed in the electronic ink layer, and each microcapsule is provided therein with the charged magnetic particles which are capable of being used to display at least one color. After the electronic paper is powered off, a magnetic field may be applied to the electronic paper, so as to adsorb the charged magnetic particles for displaying the color onto a surface of the electronic paper, thereby to conveniently perform a writing operation on the electronic paper in the power-off state without any necessity to power on the electronic paper again. In addition, it is able to adjust a thickness of a stroke by adjusting an intensity of the magnetic field. To be specific, the larger the intensity of the magnetic field is, the more the charged magnetic particles which may be adsorbed are, and the larger the thickness of the stroke is. On the contrary, the smaller the intensity of the magnetic field is, the fewer the charged magnetic particles which may be adsorbed are, and the smaller the thickness of the stroke is.

In this way, in the case that the electronic paper is used as the label to display the information and price about the article, it is able to directly apply the magnetic field to the electronic paper, so as to conveniently change the information and price about the article displayed on the label.

As shown in FIG. 1, each charged magnetic particle 1 includes: a charged sphere; magnetic nanoparticles 2 arranged at a surface of the charged sphere; and a colored layer 3 covering the magnetic nanoparticles 2 and the charged sphere, a color of the colored layer 3 being substantially identical to a color to be displayed by the charged magnetic particle 1.

Figure 3:
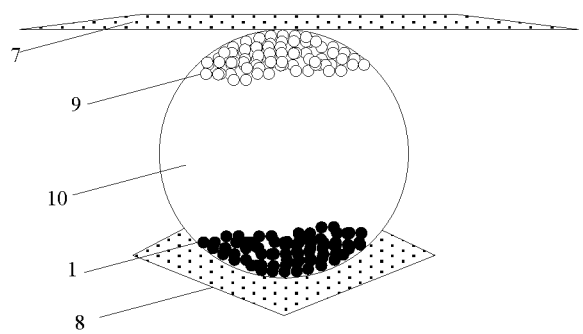
FIG. 3 is a schematic view showing a situation where a white-and-black image is displayed by an electronic paper according to one embodiment of the present disclosure.

The sphere may be positively or negatively charged. As shown in FIG. 3, in the case that an electric signal has been applied to the first electrode 7 and the second electrode 8, an electric field may be generated between the first electrode 7 and the second electrode 8. At this time, the charged sphere may move under the effect of the electric field.

To be specific, the magnetic nanoparticles 2 may be deposited onto the surface of the charged sphere through a chemical plating process. After the deposition, the charged sphere may be provided with a magnetism property and thus may be affected by a magnetic field. For example, the magnetic nanoparticles may include Ni and $Fe_3O_4$ nanoparticles.

After the deposition of the magnetic nanoparticles 2 onto the surface of the charged sphere, the color to be displayed by the charged sphere may be adversely affected by the magnetic nanoparticles. In order to ensure the display of a pure color, the colored layer 3 may cover the magnetic nanoparticles 2 and the charged sphere, and the color of the colored layer 3 may be substantially identical to the color to be displayed by the charged magnetic particle 1. The color of the colored layer 3 may be set in accordance with the practical need. In the case that a substrate of the electronic paper is in white, the colored layer 3 may be in one or more of red, green, blue and black. For example, as shown in FIG. 1, the magnetic nanoparticles 2 and the charged sphere are covered with the colored layer 3 in black.

In addition, each microcapsule 10 may be provided therein with the charged magnetic particles 1 in one color or in two or more colors. To be specific, the charged magnetic particles 1 may include at least one of black charged magnetic particles, red charged magnetic particles, green charged magnetic particles and blue charged magnetic particles.

In the case that each microcapsule 10 is provided therein with the charged magnetic particles 1 in two or more colors, the magnetism property of each charged magnetic particle 1 may be adjusted through adjusting the number of the magnetic nanoparticles 2 on the charged sphere. Then, the charged magnetic particles 1 in different colors may be adsorbed onto the surface of the electronic paper through adjusting the intensity of the magnetic field, so as to display different colors. For example, in the case that each microcapsule 10 is provided therein with red charged magnetic particles and black charged magnetic particles, more magnetic nanoparticles 2 may be deposited onto each black charged magnetic particle, so the black charged magnetic particle may have a large magnetism property. In addition, fewer magnetic nanoparticles 2 may be deposited onto each red charged magnetic particle, so the red charged magnetic particle may have a small magnetism property. In the case that the writing operation is performed on the electronic paper in the power-off state and a smaller magnetic field is applied onto the electronic paper, merely the black charged magnetic particles may be adsorbed onto the surface of the electronic paper, so as to display a black image. In addition, in the case that a larger magnetic field is applied onto the electronic paper, the black charged magnetic particles and the red charged magnetic particles may be adsorbed onto the surface of the electronic paper for display.

The present disclosure further provides in some embodiments a method for manufacturing an electronic paper, which includes steps of: forming a first electrode 7; forming a second transparent electrode 8 opposite to the first electrode 7 and at a display side of the electronic paper; and forming an electronic ink layer between the first electrode 7 and the second transparent electrode 8, microcapsules 10 being distributed in the electronic ink layer. The method further includes providing in each microcapsule 10 charged magnetic particles 1 which are capable of being used to display at least one color.

According to the embodiments of the present disclosure, the microcapsules 10 are distributed in the electronic ink layer, and each microcapsule 10 is provided therein with the charged magnetic particles 1 which are capable of being used to display at least one color. After the electronic paper is powered off, a magnetic field may be applied to the electronic paper, so as to adsorb the charged magnetic particles 1 for displaying the color onto a surface of the electronic paper, thereby to conveniently perform a writing operation on the electronic paper in the power-off state without any necessity to power on the electronic paper again. In addition, it is able to adjust a thickness of a stroke by adjusting an intensity of the magnetic field. To be specific, the larger the intensity of the magnetic field is, the more the charged magnetic particles 1 which may be adsorbed are, and the larger the thickness of the stroke is. On the contrary, the smaller the intensity of the magnetic field is, the fewer the charged magnetic particles 1 which may be adsorbed are, and the smaller the thickness of the stroke is. Illustratively but nonrestrictively, each microcapsule may be of a spherical or ellipsoidal shape.

In this way, in the case that the electronic paper is used as the label to display the information and price about the article, it is able to directly apply the magnetic field to the electronic paper, so as to conveniently change the information and price about the article displayed on the label.

In addition, the method further includes preparing the charged magnetic particles 1. The step of preparing the charged magnetic particles 1 includes: providing a charged sphere; depositing magnetic nanoparticles 2 onto a surface of the charged sphere through a chemical plating process; and depositing a colored layer 3 onto the surface of the charged sphere with the magnetic nanoparticles 2, a color of the colored layer 3 being substantially identical to a color to be displayed by the charged magnetic particle 1.

The sphere may be positively or negatively charged. As shown in FIG. 3, in the case that an electric signal has been applied to the first electrode 7 and the second electrode 8, an electric field may be generated between the first electrode 7 and the second electrode 8. At this time, the charged sphere may move under the effect of the electric field.

To be specific, the magnetic nanoparticles 2 may be deposited onto the surface of the charged sphere through a chemical plating process. After the deposition, the charged sphere may be provided with a magnetism property and thus may be affected by a magnetic field. For example, the magnetic nanoparticles 2 may include Ni and $Fe_3O_4$ nanoparticles.

After the deposition of the magnetic nanoparticles 2 onto the surface of the charged sphere, the color to be displayed by the charged sphere may be adversely affected by the magnetic nanoparticles 2. In order to ensure the display of a pure color, the colored layer 3 may cover the magnetic nanoparticles 2 and the charged sphere, and the color of the colored layer 3 may be substantially identical to the color to be displayed by the charged magnetic particle 1. The color of the colored layer 3 may be set in accordance with the practical need. In the case that a substrate of the electronic paper is in white, the colored layer 3 may be in one or more of red, green, blue and black. For example, as shown in FIG. 1, the magnetic nanoparticles 2 and the charged sphere are covered with the colored layer 3 in black.

In addition, each microcapsule 10 may be provided therein with the charged magnetic particles 1 in one color or in two or more colors. To be specific, the charged magnetic particles 1 may include at least one of black charged magnetic particles, red charged magnetic particles, green charged magnetic particles and blue charged magnetic particles.

In the case that each microcapsule 10 is provided therein with the charged magnetic particles 1 in two or more particles, the magnetism property of each charged magnetic particle 1 may be adjusted through adjusting the number of the magnetic nanoparticles 2 on the charged sphere. Then, the charged magnetic particles 1 in different colors may be adsorbed onto the surface of the electronic paper through adjusting the intensity of the magnetic field, so as to display different colors. For example, in the case that each microcapsule 10 is provided therein with red charged magnetic particles and black charged magnetic particles, more magnetic nanoparticles 2 may be deposited onto each black charged magnetic particle, so the black charged magnetic particle may have a large magnetism property. In addition, fewer magnetic nanoparticles 2 may be deposited onto each red charged magnetic particle, so the red charged magnetic particle may have a small magnetism property. In the case that the writing operation is performed on the electronic paper in the power-off state and a smaller magnetic field is applied onto the electronic paper, merely the black charged magnetic particles may be adsorbed onto the surface of the electronic paper, so as to display a black image. In addition, in the case that a larger magnetic field is applied onto the electronic paper, the black charged magnetic particles and the red charged magnetic particles may be adsorbed onto the surface of the electronic paper for display.

In the case that the nickel nanoparticles are to be deposited onto the charged sphere, the step of depositing the magnetic nanoparticles 2 onto the surface of the charged sphere through a chemical plating process may include: adding a $NiCl_2$ solution, absolute ethyl alcohol and distilled water into a solution containing the charged spheres so as to acquire a mixture, stirring the mixture, heating and stirring the mixture in a constant-temperature magnetic stirrer, and adding a NaOH solution into the mixture during a heating and stirring procedure so as to increase a pH value of the mixture to 14; and adding hydrazine hydrate into the mixture with the pH value of 14 in a dropwise manner, heating the mixture and maintaining the mixture at a temperature of 50° C. for 0.4 to 0.6 h, washing the mixture, and drying the resultant mixture in a vacuum drying oven at a temperature of 50° C. for 1.8 to 2.2 h, so as to acquire the charged sphere onto the surface of which magnetic nickel nanoparticles are deposited.

To be specific, 10 ml $NiCl_2$ solution at a concentration of 0.8 mol/L, 13.6 mL absolute ethyl alcohol and 6.7 mL distilled water may be placed into a 100 mL beaker, and then a solution containing charged spheres may be added through a pipette, so as to acquire a mixture. Next, the mixture may be stirred, and put into the constant-temperature magnetic stirrer where the mixture may be heated and stirred. During a heating and stirring procedure, 5 mol/L NaOH solution may be added into the mixture, so as to increase the pH value of the mixture to 14. Next, about 20 mL hydrazine hydrate may be added into the mixture in a dropwise manner, and a resultant mixture may be heated at a temperature of 50° C. for about 0.5 h. Next, the resultant mixture may be washed and dried in the vacuum drying oven at a temperature of 50° C. for 2 h, so as to acquire the charged sphere onto the surface of which magnetic nickel nanoparticles are deposited. Through adjusting the concentration of the $NiCl_2$ solution, it is able to provide the nickel-plated charged magnetic particles 1 with different magnetism properties.

Further, the step of depositing the colored layer onto the surface of the charged sphere deposited with the magnetic nanoparticles 2 may include subjecting the charged sphere onto the surface of which the magnetic nickel nanoparticles are deposited into ultrasonic dispersion in an ethanol solution, adding the resultant charged sphere into a dopamine solution at a concentration of 0.5 to 4 g/L and a pH value of 6.0 to 10.0, and stirring a resultant mixture at a rate of 30 to 100 rpm for 2 to 48 h, so as to acquire the black charged magnetic particle 1 onto a surface of which polydopamine particles are deposited.

The present disclosure further provides in some embodiments a handwriting electronic paper device, including the above-mentioned electronic paper. According to the embodiments of the present disclosure, the microcapsules 10 are distributed in the electronic ink layer, and each microcapsule 10 is provided therein with the charged magnetic particles 1 which are capable of being used to display at least one color. After the electronic paper is powered off, a magnetic field may be applied to the electronic paper, so as to adsorb the charged magnetic particles 1 for displaying the color onto a surface of the electronic paper, thereby to conveniently perform a writing operation on the electronic paper in the power-off state without any necessity to power on the electronic paper again. In addition, it is able to adjust a thickness of a stroke by adjusting an intensity of the magnetic field. To be specific, the larger the intensity of the magnetic field is, the more the charged magnetic particles 1 which may be adsorbed are, and the larger the thickness of the stroke is. On the contrary, the smaller the intensity of the magnetic field is, the fewer the charged magnetic particles 1 which may be adsorbed are, and the smaller the thickness of the stroke is. Illustratively but nonrestrictively, each microcapsule may be of a spherical or ellipsoidal shape.

In this way, in the case that the electronic paper is used as the label to display the information and price about the article, it is able to directly apply the magnetic field to the electronic paper, so as to conveniently change the information and price about the article displayed on the label.

Figure 2:
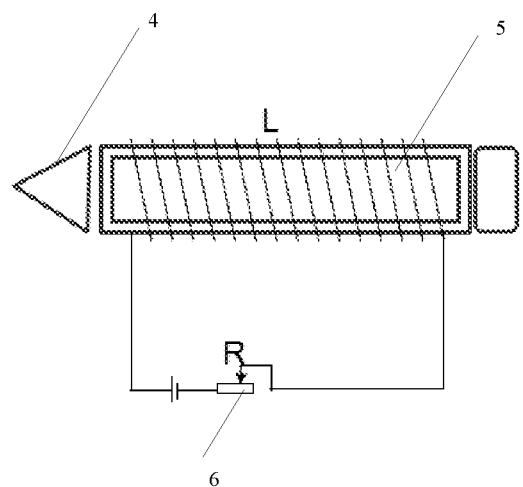
FIG. 2 is a schematic view showing an electronic stylus according to one embodiment of the present disclosure.

In a possible embodiment of the present disclosure, the handwriting electronic paper device may further include an electronic stylus. As shown in FIG. 2, the electronic stylus may include: a body 5; an electrically conductive coil wound onto the body 5; and a controller configured to control an energized state of the electrically conductive coil and a current flowing through the electrically conductive coil.

To be specific, the controller may be implemented through a variable resistor 6 connected in series with the electrically conductive coil. In the case that the handwriting operation is performed on the electronic paper in the power-off state, an intensity H of the magnetic field generated by the electronic stylus may be calculated using the equation H=N*I/L, where N represents the number of turns of the electrically conductive coil, I represents a size of the current flowing through the electrically conductive coil, and L represents a length of the body 5. In this way, it is able to adjust the size of the current I flowing through the electrically conductive coil by adjusting a resistance R of the variable resistor 6, and change the intensity of the magnetic field generated at a tip 4 of the electronic stylus, thereby to adjust the thickness of the stroke.

As shown in FIG. 3, each microcapsule 10 of the electronic paper includes white charged magnetic particles 9 and black charged magnetic particles 1. In the case that the electronic paper is powered on, the black charged magnetic particles 1 may move toward the electrode having a polarity opposite to the black charged magnetic particles 1 under the effect of the electric field, so as to display a black-and-white image.

Figure 4:
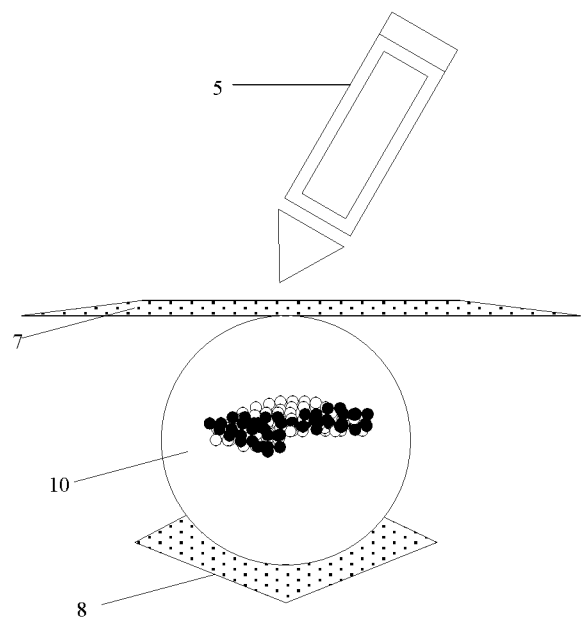
FIG. 4 is a schematic view showing a situation where a writing operation is performed on the electronic paper in a power-off state according to one embodiment of the present disclosure.
Figure 5:
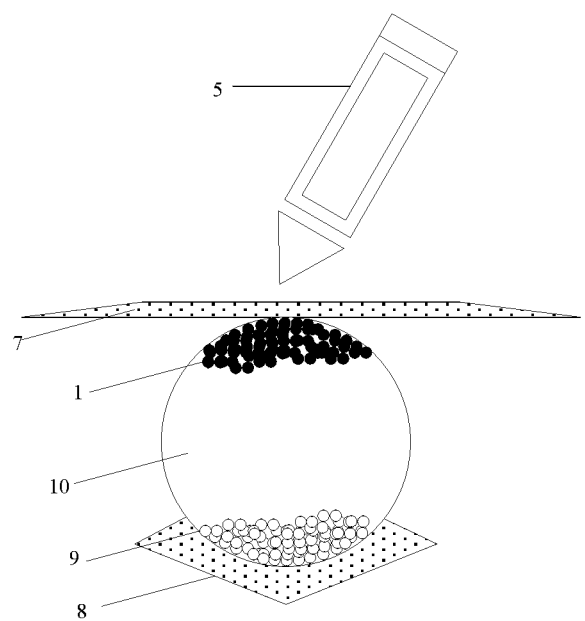
FIG. 5 is another schematic view showing a situation where the writing operation is performed on the electronic paper in the power-off state according to one embodiment of the present disclosure.

As shown in FIG. 4 and FIG. 5, after the electronic paper has been powered off, the magnetic field may be generated by the electronic stylus. In the case that the electronic stylus moves on the surface of the electronic stylus, the black charged magnetic particles 1 may move toward the surface of the electronic paper under the effect of the magnetic field. At this time, the bistability of the white charged magnetic particles 9 and the black charged magnetic particles 1 may be broken, so the black charged magnetic particles 1 may be adsorbed onto the surface of the electronic paper, so as to display the stroke. In addition, it is able to adjust the thickness of the stroke by adjusting the intensity of the magnetic field. To be specific, the larger the intensity of the magnetic field is, the more the charged magnetic particles 1 which may be adsorbed are, and the larger the thickness of the stroke is. On the contrary, the smaller the intensity of the magnetic field is, the fewer the charged magnetic particles 1 which may be adsorbed are, and the smaller the thickness of the stroke is. Illustratively but nonrestrictively, each microcapsule may be of a spherical or ellipsoidal shape.

Unless otherwise defined, any technical or scientific term used herein shall have the common meaning understood by a person of ordinary skills. Such words as "first" and "second" used in the specification and claims are merely used to differentiate different components rather than to represent any order, number or importance. Similarly, such words as "one" or "one of" are merely used to represent the existence of at least one member, rather than to limit the number thereof. Such words as "connect" or "connected to" may include electrical connection, direct or indirect, rather than to be limited to physical or mechanical connection. Such words as "on", "under", "left" and "right" are merely used to represent relative position relationship, and when an absolute position of the object is changed, the relative position relationship will be changed too.

It should be appreciated that, in the case that such an element as layer, film, region or substrate is arranged "on" or "under" another element, it may be directly arranged "on" or "under" the other element, or an intermediate element may be arranged therebetween.

The above are merely the preferred embodiments of the present disclosure, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. An electronic paper, comprising:
   a first electrode;
   a second transparent electrode arranged opposite to the first electrode and at a display side of the electronic paper; and
   an electronic ink layer arranged between the first electrode and the second transparent electrode,
   wherein microcapsules are distributed in the electronic ink layer, and each microcapsule is provided therein with charged magnetic particles which are capable of being used to display at least one color,
   wherein each charged magnetic particle comprises a charged sphere, magnetic nanoparticles arranged at a surface of the charged sphere, and a colored layer covering the magnetic nanoparticles and the charged sphere, a color of the colored layer being substantially identical to a color to be displayed by the charged magnetic particle.

2. The electronic paper according to claim 1, wherein the magnetic nanoparticles comprise nickel (Ni) and ferroferric oxide ($Fe_3O_4$) nanoparticles.

3. The electronic paper according to claim 1, wherein the charged magnetic particles comprise at least one of black charged magnetic particles, red charged magnetic particles, green charged magnetic particles or blue charged magnetic particles.

4. The electronic paper according to claim 1, wherein each microcapsule is of a spherical shape.

5. The electronic paper according to claim 1, wherein each microcapsule is of an ellipsoidal shape.

6. The electronic paper according to claim 1, wherein in the case that each microcapsule is provided therein with the charged magnetic particles in more than two colors, a magnetism property of the charged magnetic particle is adjusted by adjusting the number of the magnetic nanoparticles on the charged sphere.

7. A method for manufacturing an electronic paper, comprising:
   forming a first electrode;
   forming a second transparent electrode opposite to the first electrode and at a display side of the electronic paper;
   forming an electronic ink layer between the first electrode and the second transparent electrode, microcapsules being distributed in the electronic ink layer; and
   preparing the charged magnetic particles,
   wherein the method further comprises providing in each microcapsule charged magnetic particles which are capable of being used to display at least one color,
   wherein the step of preparing the charged magnetic particles comprises providing a charged sphere, depositing magnetic nanoparticles onto a surface of the charged sphere through a chemical plating process, and depositing a colored layer onto the surface of the charged sphere with the magnetic nanoparticles, a color of the colored layer being substantially identical to a color to be displayed by the charged magnetic particle.

8. The method according to claim 7, wherein the step of depositing the magnetic nanoparticles onto the surface of the charged sphere through a chemical plating process comprises: adding a nickel chloride ($NiCl_2$) solution, absolute ethyl alcohol and distilled water into a solution containing the charged spheres so as to acquire a mixture, stirring the mixture, heating and stirring the mixture in a constant-temperature magnetic stirrer, and adding a sodium hydroxide (NaOH) solution into the mixture during a heating and stirring procedure so as to increase a pH value of the mixture to 14; and adding hydrazine hydrate into the mixture with the pH value of 14 in a dropwise manner, heating the mixture and maintaining the mixture at a temperature of 50° C. for 0.4 to 0.6h, washing the mixture, and drying the resultant mixture in a vacuum drying oven at a temperature of 50° C. for 1.8 to 2.2h, so as to acquire the charged sphere onto the surface of which magnetic nickel nanoparticles are deposited.

9. The method according to claim 8, wherein the step of depositing the colored layer onto the surface of the charged sphere deposited with the magnetic nanoparticles comprises subjecting the charged sphere onto the surface of which the magnetic nickel nanoparticles are deposited into ultrasonic dispersion in an ethanol solution, adding the resultant charged sphere into a dopamine solution at a concentration of 0.5 to 4g/L and a pH value of 6.0 to 10.0, and stirring a resultant mixture at a rate of 30 to 100 revolutions per minute (rpm) for 2 to 48h, so as to acquire the black charged magnetic particle onto a surface of which polydopamine particles are deposited.

10. A handwriting electronic paper device, comprising an electronic paper, wherein the electronic paper comprises: a first electrode; a second transparent electrode arranged opposite to the first electrode and at a display side of the electronic paper; and an electronic ink layer arranged between the first electrode and the second transparent electrode, wherein microcapsules are distributed in the electronic ink layer, and each microcapsule is provided therein with charged magnetic particles which are capable of being used to display at least one color, wherein each charged magnetic particle comprises a charged sphere, magnetic nanoparticles arranged at a surface of the charged sphere, and a colored layer covering the magnetic nanoparticles and the charged sphere, a color of the colored layer being substantially identical to a color to be displayed by the charged magnetic particle.

11. The handwriting electronic paper device according to claim 10, wherein the magnetic nanoparticles comprise nickel (Ni) and ferroferric oxide ($Fe_3O_4$) nanoparticles.

12. The handwriting electronic paper device according to claim 10, wherein the charged magnetic particles comprise at least one of black charged magnetic particles, red charged magnetic particles, green charged magnetic particles or blue charged magnetic particles.

13. The handwriting electronic paper device according to claim 10, wherein each microcapsule is of a spherical shape.

14. The handwriting electronic paper device according to claim 10, wherein each microcapsule is of an ellipsoidal shape.

15. The handwriting electronic paper device according to claim 10, wherein in the case that each microcapsule is provided therein with the charged magnetic particles in more than two colors, a magnetism property of the charged magnetic particle is adjusted by adjusting the number of the magnetic nanoparticles on the charged sphere.

16. The handwriting electronic paper device according to claim 10, further comprising an electronic stylus, wherein the electronic stylus comprises: a body; an electrically conductive coil wound onto the body; and a controller configured to control an energized state of the electrically conductive coil and a current flowing through the electrically conductive coil.

17. The handwriting electronic paper device according to claim 10, wherein a thickness of a stroke on the electronic paper is adjusted by adjusting an intensity of a magnetic field applied onto the electronic paper.

\* \* \* \* \*